(12) United States Patent
Kuroiwa et al.

(10) Patent No.: US 8,757,903 B2
(45) Date of Patent: Jun. 24, 2014

(54) DIAPHRAGM DEVICE OF LENS

(71) Applicant: Cosina Co., Ltd., Nakano (JP)

(72) Inventors: Yohei Kuroiwa, Nakano (JP); Kazuhiro Sato, Nakano (JP)

(73) Assignee: Cosina Co., Ltd., Nagano (JP)

( * ) Notice: Subject to any disclaimer, the term of this patent is extended or adjusted under 35 U.S.C. 154(b) by 0 days.

(21) Appl. No.: 13/726,766

(22) Filed: Dec. 26, 2012

(65) Prior Publication Data

US 2013/0163979 A1 Jun. 27, 2013

(30) Foreign Application Priority Data

Dec. 27, 2011 (JP) .................................. 2011-285708

(51) Int. Cl.
*G03B 9/02* (2006.01)
(52) U.S. Cl.
CPC ........................................ *G03B 9/02* (2013.01)
USPC .......................................................... 396/505
(58) Field of Classification Search
USPC .......................................................... 396/505
See application file for complete search history.

(56) References Cited

U.S. PATENT DOCUMENTS 3,997,264 A * 12/1976 Noguchi et al. ................ 355/61
2013/0163979 A1 * 6/2013 Kuroiwa et al. .............. 396/505

FOREIGN PATENT DOCUMENTS

| JP | 39-9583 A | 6/1964 |
| JP | 50-9423 | 1/1975 |
| JP | 54-072039 U | 5/1979 |
| JP | 58-149706 U | 10/1983 |
| JP | 60-104812 U | 7/1985 |
| JP | 61-173227 A | 8/1986 |
| JP | 10-221584 A | 8/1998 |
| JP | 2009-36827 A | 2/2009 |

* cited by examiner

*Primary Examiner* — WB Perkey
(74) *Attorney, Agent, or Firm* — Birch, Stewart, Kolasch & Birch, LLP

(57) ABSTRACT

Diaphragm device of a lens includes a click mechanism with a locking portion disposed in one of a stationary tube and a diaphragm setting ring, the locking portion having an elastically supported locking element, and an entrapment body disposed on the other of the stationary tube and the diaphragm setting ring. The entrapment body having an entrapment surface wherein a plurality of entrapment portions are formed for catching the locking element pressed against the entrapment surface at one of a plurality of aperture numbers when the diaphragm setting ring is turned. A mode select mechanism for switching between a click mode wherein the locking element is pressed against the entrapment surface and a non-click mode wherein a click function is deactivated with the locking element and the entrapment surface separated from each other by altering the position of at least one of the locking portion and the entrapment body.

13 Claims, 6 Drawing Sheets

US 8,757,903 B2

DIAPHRAGM DEVICE OF LENS

TECHNICAL FIELD

The present invention relates to a diaphragm device of a lens having a click mechanism which makes it possible to set a diaphragm setting ring at positions corresponding to specific values of aperture (numerical aperture) with click action.

BACKGROUND ART

A diaphragm setting ring disclosed in Japanese Laid-open Utility Model Application No. 1979-72039 and a click stop mechanism disclosed in Japanese Laid-open Patent Application No. 1986-173227 are conventionally known examples of a diaphragm setting ring rotatably mounted on a stationary tube of a lens barrel to adjust a lens aperture and a diaphragm device of a lens including a click mechanism capable of stopping such a diaphragm setting ring at positions corresponding to a plurality of aperture numbers with click action, respectively.

The diaphragm setting ring described in Japanese Laid-open Utility Model Application No. 1979-72039 has a plurality of click stock grooves formed in a curved inside surface of the diaphragm setting ring at specific intervals along a circumferential direction of the curved inside surface and a click ball disposed on a curved outside surface of the stationary tube facing the curved inside surface of the ring, the click ball being forced outward by a leaf spring. The diaphragm setting ring thus configured makes it possible to take a picture at one of lens apertures defined at individual stop positions. Also, the click stop mechanism described in Japanese Laid-open Patent Application No. 1986-173227 has a plurality of click grooves formed in a curved inside surface of a diaphragm preset ring at specific intervals along a circumferential direction and a click ball disposed on a stationary ring facing the curved inside surface of the diaphragm preset ring, the click ball being forced outward by a leaf spring. In this click stop mechanism, the click ball is pressed against the curved inside surface of the diaphragm preset ring.

SUMMARY OF INVENTION

Technical Problem

The aforementioned conventional diaphragm devices of lenses (i.e., the diaphragm setting ring and the click stop mechanism) have problems described below.

Firstly, in the case of a single-lens reflex digital camera which has a manually operable diaphragm setting ring and incorporates a video camera function as a result of a recent trend toward higher performance and multi-functionalization, for example, a diaphragm setting ring provided with a click mechanism may exert more or less adverse effects on other functions of the camera. One of such effects is that a microphone of the camera can pick up vibrations and click sounds produced when the click mechanism clicks during use of the video camera function.

Secondly, a click mechanism associated with a manually operable diaphragm setting ring serves as an aid in setting a desired aperture number, so that the click mechanism enables a user of a camera to quickly set the camera at the desired aperture number. on the other hand, the click mechanism is not necessarily needed from a viewpoint of providing smooth operability in cases where the user intends to continuously vary the aperture or operate the camera to take a picture in a "maniacal" fashion regardless of the aperture number, for example. It would therefore be possible to provide the user with enhanced ease of operation and more comfortable handling of the camera if a feeling produced by the aforementioned click action is simply eliminated without affecting the operability (operational feeling), but the conventional lenses can not meet this requirement.

An object of the present invention is to provide a diaphragm device of lens which solves the above described problems in the conventional diaphragm devices of lenses.

Solution to Problem

To solve the aforementioned problems, a diaphragm device 1 of a lens according to the present invention comprises a diaphragm setting ring 3 rotatably mounted on a stationary tube 2c of a lens barrel 2 so as to be able to adjust a lens aperture, a click mechanism Uc capable of stopping the diaphragm setting ring 3 at positions corresponding to a plurality of aperture numbers with click action, the click mechanism Uc including a locking portion 5 disposed in one of the stationary tube 2c and the diaphragm setting ring 3, the locking portion 5 having an elastically supported locking element 4, and an entrapment body 6 disposed on the other of the stationary tube 2c and the diaphragm setting ring 3, the entrapment body 6 having an entrapment surface 6f in which a plurality of entrapment portions 6c are formed, the entrapment portions 6c being capable of catching the locking element 4 pressed against the entrapment surface 6f at one of the positions corresponding to the plurality of aperture numbers when the diaphragm setting ring 3 is turned, and a mode select mechanism Um which makes it possible to switch the diaphragm device between click mode Mc in which the locking element 4 is pressed against the entrapment surface 6f and non-click mode Mn in which a click function is deactivated with the locking element 4 and the entrapment surface 6f separated from each other by altering the position of at least one of the locking portion 5 and the entrapment body 6.

Advantageous Effects of Invention

The diaphragm device 1 of the lens thus configured produces notable advantageous effects which are described below.

(1) The diaphragm device is provided with the mode select mechanism Um which makes it possible to switch the diaphragm device to either the click mode Mc in which the locking element 4 is pressed against the entrapment body 6f or the non-click mode Mn in which the entrapment body 6f is set apart from the locking element 4 and the clicking function is deactivated by altering the position of at least one of the locking portion 5 and the entrapment body 6. By switching to the non-click mode Mn, it is therefore possible to avoid such a problem that a microphone picks up vibrations or click sounds produced by click action during use of a video camera function, for example. This feature serves to provide an enhanced picture-taking quality (sound pickup quality) during use of the video camera function and exclude adverse effects of a click mechanism Uc when necessary.

(2) The diaphragm device allows a user to arbitrarily select the click mode Mc or the non-click mode Mn, making it possible to take advantages of both modes Mc, Mn and thus providing the user with enhanced ease of operation and more comfortable handling of a camera. More specifically, when the click mode Mc is selected, the user can quickly set the camera at a desired aperture number during manual operation as the diaphragm setting ring 3 serves as an aid in setting the aperture number, whereas when the non-click mode Mn is selected, the lens assures smooth operability in cases where the user intends to continuously vary the aperture or operate the diaphragm setting ring 3 to take a picture in a maniacal fashion regardless of the aperture number, for example. In addition, because the non-click mode Mn eliminates only a feeling produced by the click action while the operability (operational feeling) remains unchanged regardless of whether the lens is in the click mode Mc or the non-click mode Mn, it is possible to prevent such problems as operational errors caused by a difference in operating skill.

(3) If the click mechanism Uc is configured by employing a click ball 4r which serves as the locking element 4 and click grooves 6cs which constitute the entrapment portions 6c in a preferable way, it is possible to structure the click mechanism Uc which works most smoothly. This makes it possible to manufacture the click mechanism Uc most suitable for achieving the object of the invention.

(4) If the click mechanism Uc is configured with a mode select ring portion 11 rotatably mounted on the stationary tube 2c, the mode select ring portion 11 being capable of altering the position of the entrapment body 6, in a preferable way, it is possible to perform intended functions of the diaphragm setting ring 3 and the click mechanism Uc without affecting (jeopardizing) smooth functioning thereof.

(5) If the mode select mechanism Um is configured to have a capability to switch the lens to either the click mode Mc in which the locking element 4 is pressed against the entrapment body 6f or the non-click mode Mn in which the locking element 4 is set apart from the entrapment body 6f along an axial direction Fs by displacing at least one of the locking element 4 and the entrapment body 6 along the axial direction Fs in a preferable way, it is possible to switch the lens between the two modes Mc, Mn with a slight operating stroke. This serves to enhance ease of operation and promptness of mode switching.

(6) If the click mechanism Uc is configured with the locking portion 5 disposed in one of an inside surface 3i of the diaphragm setting ring 3 and a curved outside surface 2cf of the stationary tube 2c and the entrapment body 6 disposed on the other of the inside surface 3i and the curved outside surface 2cf in a preferable way, it becomes unnecessary to separately provide the entrapment body 6. This makes it possible to implement the diaphragm device having the click mechanism Uc at low cost without causing an increase in the number of components or an increase in size. Furthermore, it is possible to easily configure the mode select mechanism Um capable of switching between the click mode Mc and the non-click mode Mn by displacing the diaphragm setting ring 3 along the axial direction Fs.

(7) If the mode select mechanism Um is provided with a locking mechanism 12 which locks the locking portion 5 or the entrapment body 6 in position when the lens is switched to the click mode Mc or the non-click mode Mn in a preferable way, it is possible to prevent the diaphragm device from being accidentally switched from the click mode Mc to the non-click mode Mn, or vice versa, owing to an impact or vibration during operation.

DESCRIPTION OF EMBODIMENTS

A best mode of carrying out the present invention is now described in detail with reference to the accompanying drawings. It should be noted that the drawings do not limit the present invention in any way but are merely intended to facilitate understanding of the invention. In addition, to avoid any unclear description of the invention, the following discussion does not contain a detailed description of such technical features that are publicly known.

To facilitate understanding of a diaphragm device 1 of the present embodiment, a general configuration of a lens L provided with the relevant diaphragm device 1 is first described with reference to FIG. 1.

Figure 1:
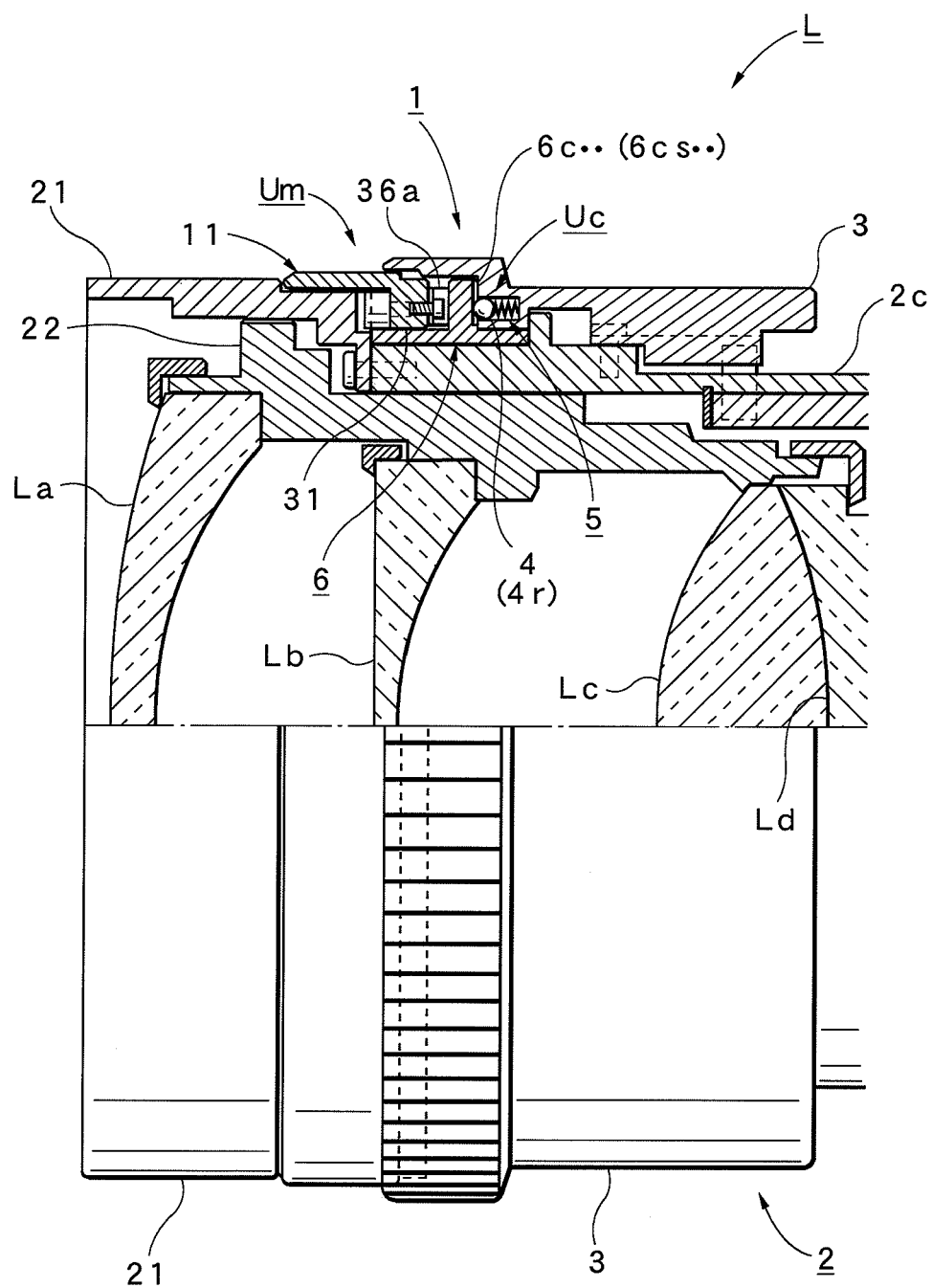
FIG. 1 is a partially cross-sectional side view of a lens including a diaphragm device according to a preferred embodiment of the invention.

The lens L depicted in FIG. 1 is an interchangeable lens usable with a digital camera which may be a single-lens reflex camera, for example. The digital camera discussed hereinbelow is of a type featuring not only a single-lens reflex camera function but also a video camera function.

Designated by the numeral 2 is a lens barrel of the lens L. The lens barrel 2 includes a stationary tube 2c associated with a filter frame 21 affixed to a front end of the stationary tube 2c, as well as a lens support frame 22 disposed on an inside surface of the stationary tube 2c. The filter frame 21 is configured such that a filter can be detachably mounted on a foremost end. Supported on a curved inside surface of the lens support frame 22 are a plurality of lens elements La, Lb, Lc, Ld, and so on. Although this kind of interchangeable lens typically includes a manual or automatic focusing mechanism and a zooming mechanism, such mechanisms of the present embodiment are not illustrated in the accompanying drawings for the sake of simplicity.

Figure 6:
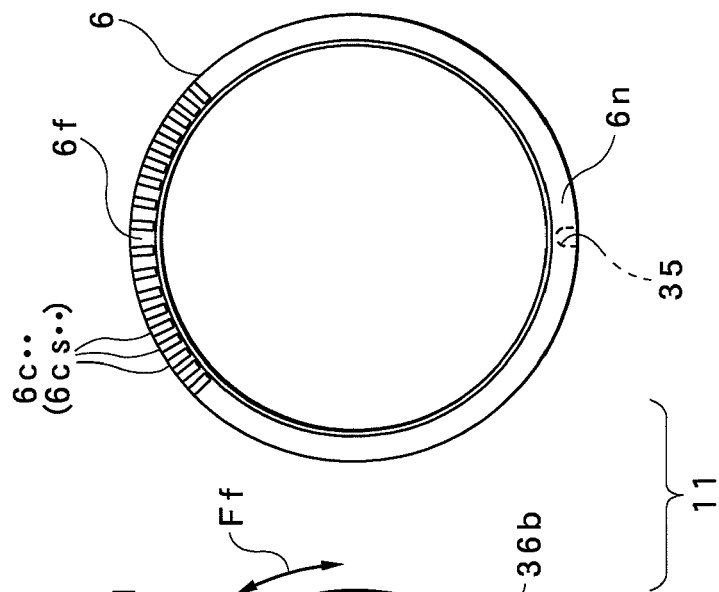
FIG. 6(a) is a rear view of a filter frame provided in the diaphragm device on the side of a stationary tube.
FIG. 6(b) is a rear view of a mode select ring portion (operating ring) provided in the diaphragm device on the side of the stationary tube.
FIG. 6(c) is a rear view of the mode select ring portion (entrapment body) provided in the diaphragm device on the side of the stationary tube.
Figure 6:
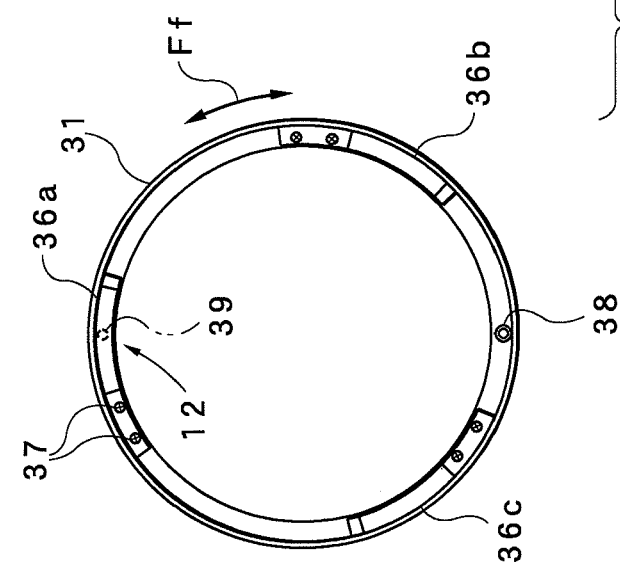
Figure 6:
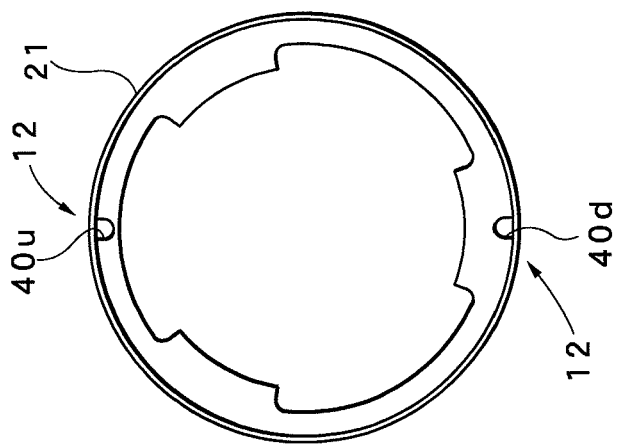

A diaphragm setting ring 3 is rotatably mounted on a curved outside surface of the stationary tube 2c. The diaphragm setting ring 3 is kept from being displaced in neither a front nor a rear dimension (axial direction Fs) relative to the stationary tube 2c but is only allowed to be turned along a circumferential direction Ff (refer to FIG. 6). A rotational displacement of the diaphragm setting ring 3 is transmitted to a diaphragm setting mechanism (not shown) via a link mechanism having a conventionally known configuration. This arrangement makes it possible to adjust aperture size (numerical aperture) in a desired manner by turning the diaphragm setting ring 3.

Figure 2:
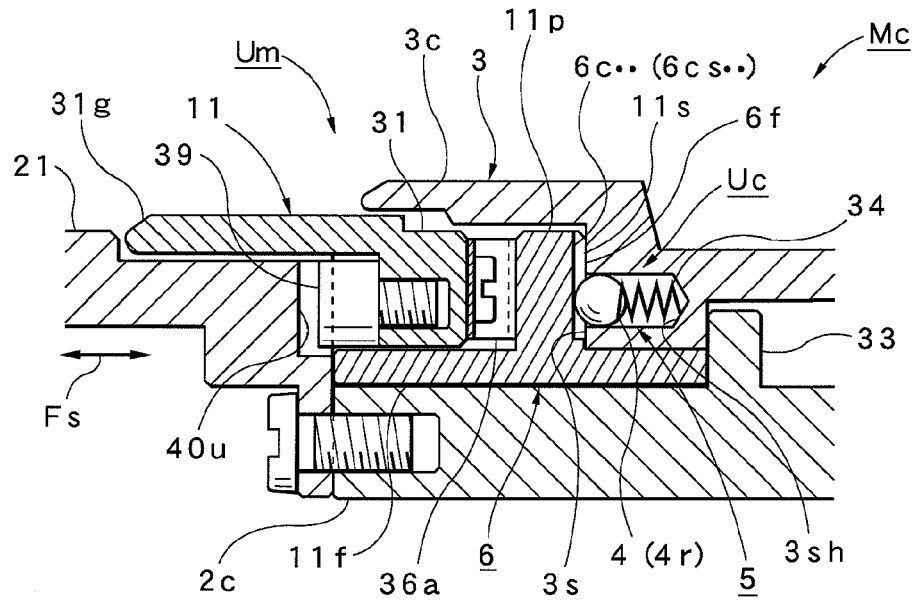
FIG. 2 is an enlarged fragmentary cross-sectional side view of the lens in a state in which the diaphragm device is set in a click mode.

A mode select ring portion 11 constituting part of a mode select mechanism Um is rotatably mounted on the curved outside surface of the stationary tube 2c at the front of the diaphragm setting ring 3. The mode select ring portion 11 constitutes part of the stationary tube 2c from a viewpoint of a relationship with the diaphragm setting ring 3. The mode select ring portion 11 is configured with a pair of ring members, that is, an operating ring 31 located at a frontward position and an entrapment body 6 located at a rearward position as depicted in FIG. 2. The entrapment body 6 includes a tube portion 11f and an entrapment surface forming portion 11p which is formed integrally with the tube portion 11f, extending perpendicularly outward from a curved outside surface thereof all around the tube portion 11f. In this configuration, the tube portion 11f is located between a stopper rim 33 formed integrally with the stationary tube 2c on the curved outside surface thereof and a rear end of the filter frame 21, so that the tube portion 11f is kept from being displaced in neither the front nor the rear dimension (axial direction Fs) but allowed to be turned along the circumferential direction Ff.

Figure 5:
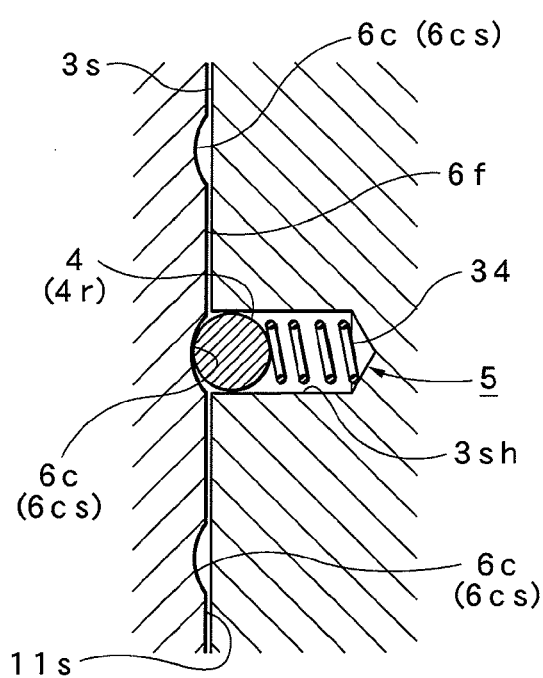
FIG. 5(a) is a cross-sectional plan view of a click mechanism provided in the diaphragm device in click mode.
FIG. 5(b) is a cross-sectional plan view of a click mechanism provided in the diaphragm device in non-click mode.
Figure 5:
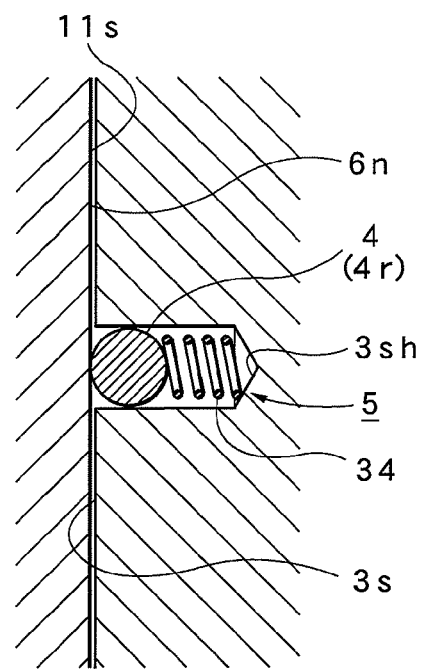

Further, a click mechanism Uc is disposed between the diaphragm setting ring 3 and the entrapment body 6 mentioned above. Featuring a click function which makes it possible to stop the diaphragm setting ring 3 at positions corresponding to a plurality of aperture numbers, the click mechanism Uc is configured with a locking portion 5 disposed in a front surface 3s of the diaphragm setting ring 3 and the entrapment body 6 disposed on the side of the stationary tube 2c. Here, the locking portion 5 includes an elastically supported locking element 4. Specifically, an accommodating recess 3sh is formed in the front surface 3s of the diaphragm setting ring 3 along the axial direction Fs, and a coil spring 34 and a click ball 4r which serves as the locking element 4 are accommodated in the accommodating recess 3sh in this order. As depicted in FIG. 6(c), on the other hand, a rear side of the entrapment body 6 includes a portion constituting an entrapment surface 6f against which the click ball 4r is pressed and in which a plurality of entrapment portions 6c capable of catching the click ball 4r at the positions corresponding to the plurality of aperture numbers when the diaphragm setting ring 3 is turned are formed. The individual entrapment portions 6c are formed with click grooves 6cs which extend along radial directions. The click grooves 6cs each have an arcshaped cross section as depicted in FIG. 5(a) and this shape is so determined that a desirable "click" feeling is obtained when the click ball 4r is caught by each of the click grooves 6cs. The click mechanism Uc is configured in the aforementioned manner, including the locking portion 5 having the click ball 4r elastically supported in the diaphragm setting ring 3 and the entrapment body 6 having the entrapment body 6f in which the plurality of click grooves 6cs capable of catching the click ball 4r at the positions corresponding to the prescribed aperture numbers when the diaphragm setting ring 3 is turned are formed.

The click mechanism Uc is configured by employing the click ball 4r which serves as the locking element 4 and the click grooves 6cs which constitute the entrapment portions 6c as described above so that the click mechanism Uc works most smoothly. This makes it possible to manufacture the diaphragm device 1 most suitable for achieving the object of the invention. If the click mechanism Uc is configured with the mode select ring portion 11 mounted rotatably around the stationary tube 2c, the mode select ring portion 11 having an end surface 11s facing the end surface 3s of the diaphragm setting ring 3, and the locking portion 5 is disposed in one of the end surface 3s of the diaphragm setting ring 3 and the end surface 11s of the mode select ring portion 11 while the entrapment body 6 is disposed in the other thereof, it is possible to additionally provide a function of switching between click mode Mc and non-click mode Mn by using the mode select ring portion 11. This configuration is advantageous in that mode switching can be performed without affecting (jeopardizing) intended smooth functioning of the diaphragm setting ring 3 and the click mechanism Uc.

The rear side of the entrapment body 6 also includes a portion constituting a flat surface 6n in which no click mechanism 6cs is formed as depicted in FIG. 5B, the flat surface 6n being located on a generally 180-degree opposite side of the entrapment body 6f. With the entrapment body 6 thus configured, it is possible to activate the click mode Mc in which the click ball 4r is pressed against the entrapment body 6f, causing the click mechanism Uc to produce a desirable click feeling, and activate the non-click mode Mn by turning the entrapment body 6 by 180 degrees in the circumferential direction Ff so that the click ball 4r is pressed against the flat surface 6n to produce no click feeling with the clicking function of the click mechanism Uc deactivated. The non-click mode Mn is a mode in which the click grooves 6cs are just brought to a non-functioning location and, therefore, operation in the non-click mode Mn does not result in a change in the amount of operating torque required when turning the diaphragm setting ring 3 or otherwise cause any change in operational feeling.

Figure 4:
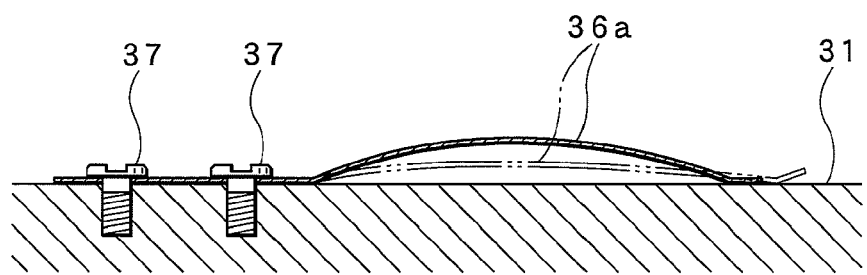
FIG. 4 is a fragmentary cross-sectional view depicting in particular a leaf spring provided in the diaphragm device.

In a front surface of the entrapment body 6, there is formed an engagement recess 35 depicted in FIG. 6(c) that is cut out along the axial direction Fs at a position on a 180-degree opposite side with respect to a generally central position of the entrapment body 6f. On the other hand, three leaf springs 36a, 36b, 36c located at equal circumferential intervals along the circumferential direction are affixed to a rear surface of the operating ring 31 which is disposed in front of the entrapment body 6 as depicted in FIGS. 2 and 6(b). Each of these leaf springs 36a, 36b, 36c is curved in an arc shape and affixed to the rear surface of the operating ring 31 at one end by a pair of fixing screws 37 with the other end left movable as a free end as depicted in FIG. 4. With this arrangement, the individual leaf springs 36a, 36b, 36c press against the front surface of the entrapment body 6 and, thus, the operating ring 31 is forced frontward.

Further, an engagement pin 38 depicted in FIG. 6(b) which extends rearward is fixed to the rear surface of the operating ring 31 at a specific position thereof. This engagement pin 38 can fixedly fit in the aforementioned engagement recess 35. An engagement pin 39 depicted in FIGS. 2 and 6(b) which extends frontward is fixed to a front surface of the operating ring 31 at a position located on a side 180-degree opposite to the engagement pin 38. On the other hand, a pair of engagement recesses 40u, 40d which are cut out along the axial direction Fs are formed in a rear surface of the filter frame 21 at positions 180-degree opposite to each other as depicted in FIGS. 2 and 6(a). The aforementioned engagement pin 39 can fixedly fit in each of the engagement recesses 40u, 40d. The above-described arrangement constitutes a locking mechanism 12 which locks the locking portion 5 or the entrapment body 6 in position when the click mode Mc or the non-click mode Mn is selected. The provision of the locking mechanism 12 thus configured serves to prevent the diaphragm device 1 from being accidentally switched from the click mode Mc to the non-click mode Mn, or vice versa, owing to an impact or vibration during operation.

Configured in the aforementioned fashion is the mode select mechanism Um which can switch the diaphragm device 1 to either the click mode Mc in which the click ball 4r is pressed against the entrapment body 6f or the non-click mode Mn in which the entrapment body 6f is set apart from the click ball 4r along the circumferential direction Ff and the click ball 4r is pressed against the flat surface 6n where no click grooves 6cs are formed by turning the mode select ring portion 11. The provision of the mode select mechanism Um thus configured makes it possible to switch the diaphragm device 1 between the click mode Mc and the non-click mode Mn in a smooth and reliable fashion by altering an angular position of the mode select ring portion 11.

On the other hand, the operating ring 31 is configured to include an integrally formed cylindrical operating portion 31g which extends frontward from an outer peripheral part of the operating ring 31, a frontal part of the operating portion 31g covering a rear part of the filter frame 21, and the aforementioned diaphragm setting ring 3 is configured to include an integrally formed cylindrical cover portion 3c which extends frontward at a forward end of the diaphragm setting ring 3, a frontal part of the cover portion 3c covering a rear part of the operating portion 31g. This configuration provides the lens L with an external appearance as illustrated in FIG. 1.

Functioning and a method of operation of the diaphragm device 1 of the present embodiment are described hereunder with reference to FIGS. 1 through 6(a)-6(c).

Described at first is a case where the diaphragm device 1 is switched to the click mode Mc. In the click mode Mc, the click ball 4r biased by the coil spring 34 is pressed against the entrapment body 6f as depicted in FIG. 2. In this situation, the engagement pin 39 provided on the front surface of the operating ring 31 fits in the engagement recess 40u provided in the rear surface of the filter frame 21 which is fixed while the engagement pin 38 provided on the rear surface of the filter frame 21 fits in the engagement recess 35 provided in the front surface of the entrapment body 6, so that the entrapment body 6 is kept from being rotated in the circumferential direction Ff. Thus, if the diaphragm setting ring 3 is turned to adjust the aperture, the click ball 4r moves along the entrapment body 6f in sliding action and, as a consequence, the click ball 4r can be caused to stop at one of the positions of the click grooves 6es in click action as depicted in FIG. 5(a).

Figure 3:
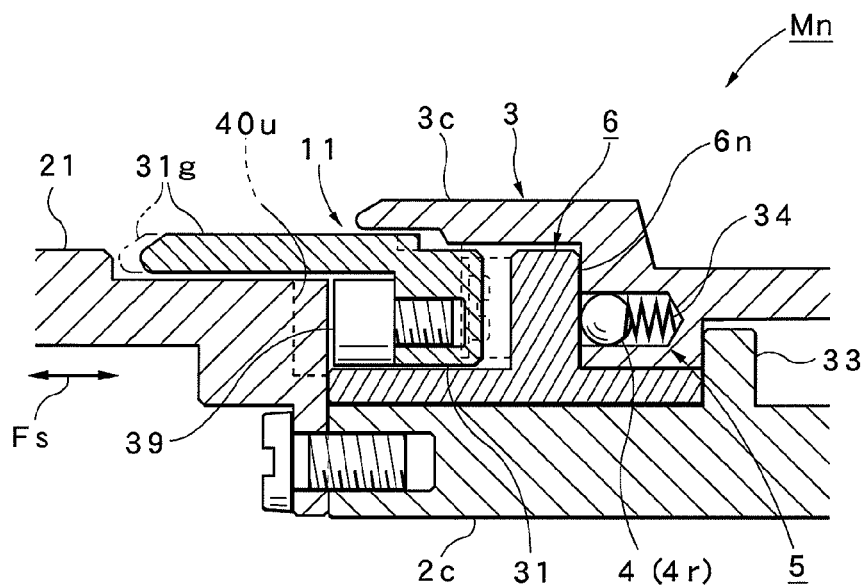
FIG. 3 is an enlarged fragmentary cross-sectional side view of the lens in a state in which the diaphragm device is set in a non-click mode.

Described next is a case where the diaphragm device 1 is switched from the click mode Mc to the non-click mode Mn. In this case, a user holds the operating ring 31 by hand, displaces the same rearward as depicted in FIG. 3 and then turns the operating ring 31 by 180 degrees. As the leaf springs 36a, 36b, 36c exist between the operating ring 31 and the entrapment body 6, the engagement pin 39 comes off the engagement recess 40u if the user displaces the operating ring 31 rearward against an elastic force exerted by the leaf springs 36a, 36b, 36c. Consequently, the engagement pin 39 is released from the engagement recess 40u, enabling the user to turn the operating ring 31. Since the entrapment body 6 is interlocked with the operating ring 31 via the engagement recess 35 and the engagement pin 38 in this situation, the entrapment body 6 revolves together with the operating ring 31 which is turned by the user. When the user turns the operating ring 31 by 180 degrees subsequently, the engagement pin 39 biased by the elastic force of the leaf springs 36a, 36b, 36c automatically fits in the other engagement recess 40d. As a result, the diaphragm device 1 is switched to the non-click mode Mn and the entrapment body 6 is locked in position by the locking mechanism 12.

Consequently, the click ball 4r presses against the flat surface 6n of the entrapment body 6 as depicted in FIGS. 3 and 5(b). Since no click grooves 6cs are formed in the flat surface 6n, the clicking function of the click mechanism Uc is deactivated and, thus, the user does not perceive any click feeling when turning the diaphragm setting ring 3 by hand in the non-click mode Mn. If it is intended to switch the diaphragm device 1 from the non-click mode Mn to the click mode Mc, the user can return to the click mode Mc by simply reversing the above-described procedure.

The diaphragm device 1 of the lens L according to the present embodiment is provided with the mode select mechanism Um which makes it possible to switch the diaphragm device 1 to either the click mode Mc in which the click ball 4r is pressed against the entrapment body 6f or the non-click mode Mn in which the entrapment body 6f is set apart from the click ball 4r and the clicking function is deactivated by displacing the entrapment body 6 as described above. It is therefore possible to avoid such a problem that a microphone picks up vibrations or click sounds produced by click action during use of the video camera function, for example. This feature of the embodiment serves to provide an enhanced picture-taking quality (sound pickup quality) during use of the video camera function and exclude adverse effects of the click mechanism Uc when necessary. Moreover, the diaphragm device 1 of the embodiment allows the user to arbitrarily select the click mode Mc or the non-click mode Mn, making it possible to take advantages of both modes Mc, Mn and thus providing the user with enhanced ease of operation and more comfortable handling of the camera. More specifically, when the click mode Mc is selected, the user can quickly set the camera at a desired aperture number during manual operation as the diaphragm setting ring 3 serves as an aid in setting the aperture number, whereas when the non-click mode Mn is selected, the lens L assures smooth operability in cases where the user intends to continuously vary the aperture or operate the diaphragm setting ring 3 to take a picture in a maniacal fashion regardless of the aperture number, for example. In addition, because the non-click mode Mn eliminates only a feeling produced by the aforementioned click action while the operability (operational feeling) remains unchanged regardless of whether the lens L is in the click mode Mc or the non-click mode Mn, it is possible to prevent such problems as operational errors caused by a difference in operating skill.

Figure 7:
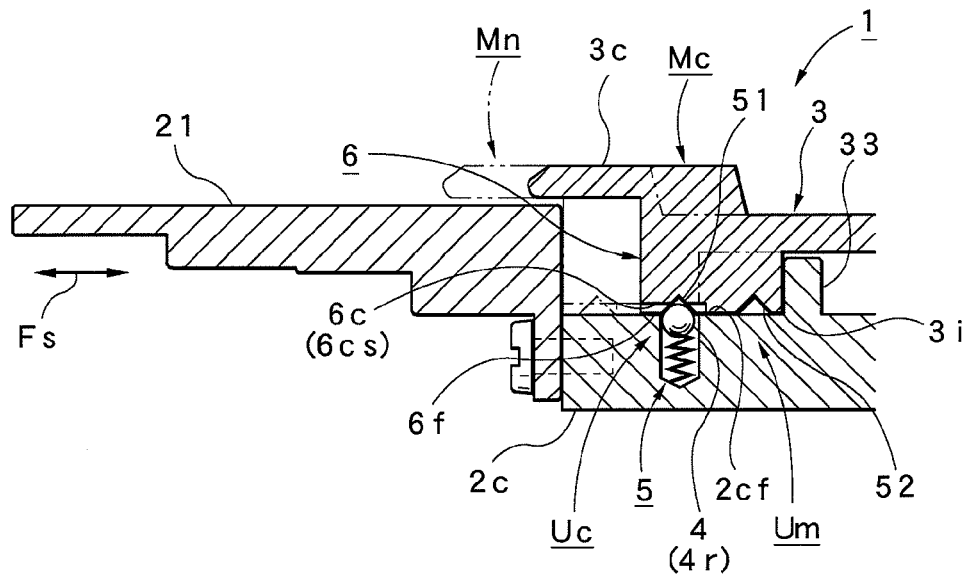
FIG. 7 is a cross-sectional plan view depicting part of a diaphragm device in one modification of the embodiment of the invention.
Figure 8:
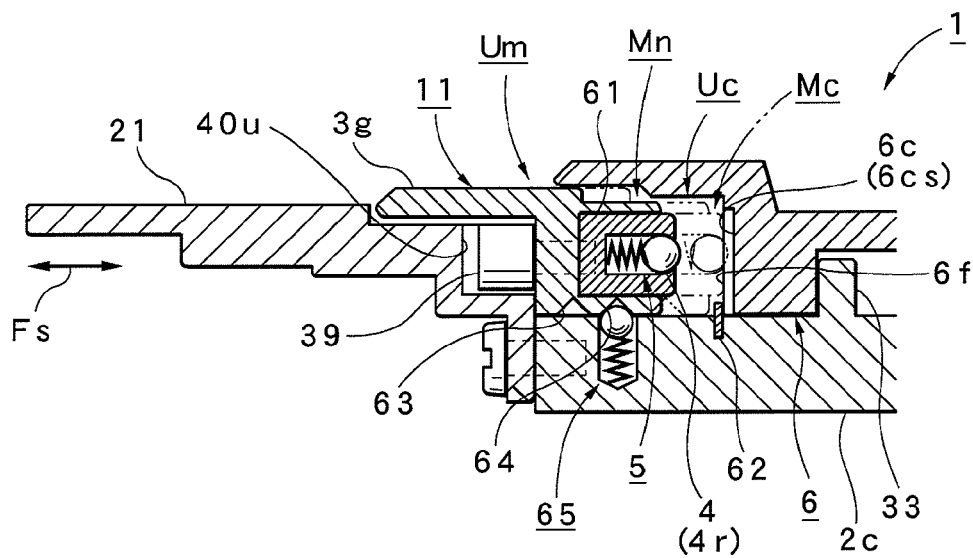
FIG. 8 is a cross-sectional plan view depicting part of a diaphragm device in another modification of the embodiment of the invention.
Figure 9:
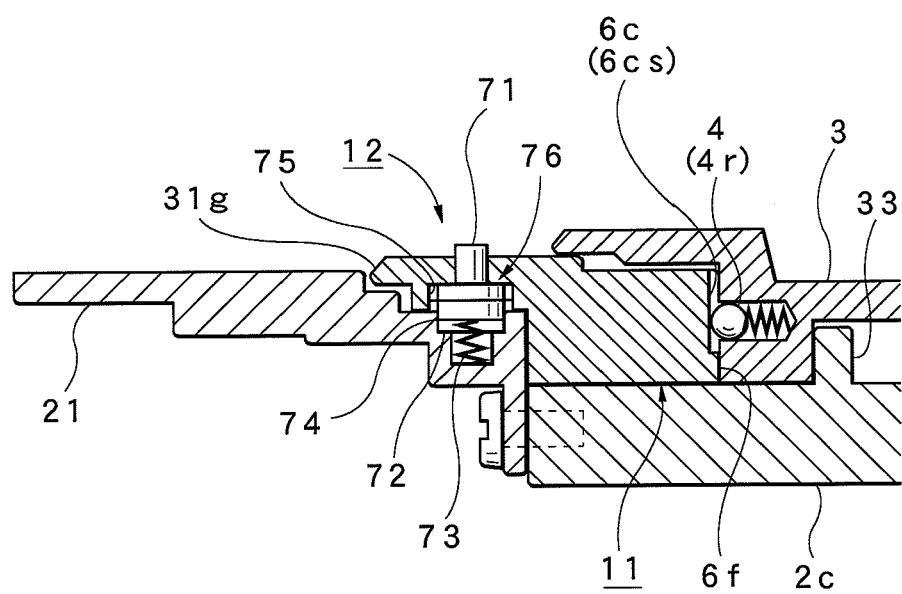
FIG. 9 is a cross-sectional plan view depicting part of a diaphragm device in still another modification of the embodiment of the invention.

Described next with reference to FIGS. 7 to 9 are diaphragm devices 1 of lenses L in modifications of the embodiment of the present invention.

The diaphragm device 1 depicted in FIG. 7 is characterized in that the click mechanism Uc is configured with the locking portion 5 disposed in a curved outside surface 2cf of the stationary tube 2c and the entrapment body 6 disposed on an inside surface 3i of the diaphragm setting ring 3. Accordingly, part of the diaphragm setting ring 3 serves also as the entrapment body 6. In this case, click grooves 6cs extending parallel to the axial direction Fs are formed side by side in the inside surface 3i of the diaphragm setting ring 3 along a circumferential direction thereof. Also, the mode select mechanism Um is configured such that mode switching can be performed by displacing the diaphragm setting ring 3 along the axial direction Fs. Specifically, the lens L is switched to the click mode Mc in which the click ball 4r is pressed against the entrapment body 6f if the diaphragm setting ring 3 is moved rearward along the axial direction Fs and set at a position indicated by solid lines in FIG. 7, whereas the lens L is switched to the non-click mode Mn in which the click ball 4r is separated away from the entrapment body 6f along the axial direction Fs if the diaphragm setting ring 3 is moved frontward along the axial direction Fs and set at a position indicated by imaginary lines (alternate long and two short dashed lines) in FIG. 7. Meanwhile, designated by the numeral 51 in FIG. 7 is a V groove in which the click ball 4r fits when the lens L is switched to the click mode Mc and designated by the numeral 52 in FIG. 7 is a V groove in which the click ball 4r fits when the lens L is switched to the non-click mode Mn. Each of the V grooves 51, 52 is formed to cover at least a rotatable range of the diaphragm setting ring 3 along the circumferential direction Ff of the inside surface 3i of the diaphragm setting ring 3.

According to the click mechanism Uc configured as depicted in FIG. 7, the locking portion 5 is disposed in the curved outside surface 2cf of the stationary tube 2c and the entrapment body 6 is disposed on the inside surface 3i of the diaphragm setting ring 3. It is therefore possible to structure the click mechanism Uc without employing the dedicated mode select ring portion 11. This makes it possible to implement the diaphragm device 1 having the click mechanism Uc at low cost without causing an increase in the number of components or an increase in size. Furthermore, it is possible to easily configure the mode select mechanism Um capable of switching between the click mode Mc and the non-click mode Mn by displacing the diaphragm setting ring 3 along the axial direction Fs. Additionally, this mode select mechanism Um is configured to be able to switch the lens L to either the click mode Mc in which the click ball 4r is pressed against the entrapment body 6f or the non-click mode Mn in which the click ball 4r is separated away from the entrapment body 6f along the axial direction Fs by simply displacing the diaphragm setting ring 3 along the axial direction Fs. Therefore, it is possible to switch the lens L between the click mode Mc and the non-click mode Mn with a slight operating stroke, thereby enhancing ease of operation and promptness of mode switching.

The diaphragm device 1 depicted in FIG. 8, on the other hand, is characterized in that the click mechanism Uc is configured by employing a mode select ring portion 11 having essentially the same shape as the operating ring 31 depicted in FIGS. 1 to 3, while the locking portion 5 is disposed in a rear surface of this mode select ring portion 11 and a front surface of the diaphragm setting ring 3 is used as the entrapment surface 6f. Accordingly, part of the diaphragm setting ring 3 serves also as the entrapment body 6. In this case, click grooves 6cs extending along radial directions are formed side by side in the entrapment body 6f along a circumferential direction thereof. Also, a separately prepared locking element retainer 61 is affixed to the rear surface of the mode select ring portion 11 and the aforementioned locking portion 5 is disposed in the locking element retainer 61. Incidentally, an opening at a far end of the locking element retainer 61 is formed to have a small diameter so that the click ball 4r of the locking portion 5 will not come off the locking element retainer 61. Further, the mode select mechanism Um is configured such that mode switching can be performed by displacing the mode select ring portion 11 along the axial direction Fs. Specifically, the lens L is switched to the click mode Mc in which the click ball 4r is pressed against the entrapment body 6f if the mode select ring portion 11 is moved rearward along the axial direction Fs and set at a position indicated by imaginary lines (alternate long and two short dashed lines) in FIG. 8, whereas the lens L is switched to the non-click mode Mn in which the click ball 4r is separated away from the entrapment body 6f along the axial direction Fs if the mode select ring portion 11 is moved frontward along the axial direction Fs and set at a position indicated by solid lines in FIG. 8.

Therefore, the mode select ring portion 11 is so configured as to be displaceable for a specified range of stroke along the axial direction Fs and the engagement pin 39 fits in the engagement recess 40u to restrict a rotational displacement of the mode select ring portion 11 along the circumferential direction Ff. Also, a displacement of the diaphragm setting ring 3 along the axial direction Fs is restricted by a stopper member 62. Further, V-grooved engagement recesses 63, 64 are formed in a curved inside surface of the mode select ring portion 11 to cover at least a rotatable range thereof along the circumferential direction Ff and a locking portion 65 which can engage with either of the engagement recesses 63, 64 is formed in the curved outside surface of the stationary tube 2c as depicted in FIG. 8. The locking portion 65, which may be configured in the same way as the earlier-described locking portion 5, engages with one of the engagement recesses 63, 64 when the mode select ring portion 11 is moved along the axial direction Fs to set the mode select ring portion 11 at a position to select the click mode Mc or the non-click mode Mn whichever desired.

Accordingly, employing the click mechanism Uc and the mode select mechanism Um depicted in FIG. 8, it is possible to eliminate the need for the separately provided entrapment body 6 of the embodiment depicted in FIGS. 1 to 3. Thus, as is the case with the aforementioned modification of the embodiment depicted in FIG. 7, it is possible to switch the lens L between the click mode Mc and the non-click mode Mn with a slight operating stroke, thereby enhancing ease of operation and promptness of mode switching. Meanwhile, in the above-described modification of the embodiment depicted in FIG. 8, the click mode Mc and the non-click mode Mn potentially may produce somewhat different operator feelings. For this reason, the amount of operating torque needed for turning the diaphragm setting ring 3 may be increased or other means may be taken to produce as similar operator feelings as possible between the click mode Mc and the non-click mode Mn.

The diaphragm device 1 depicted in FIG. 9 is characterized by employing a locking mechanism 12 which is modified from that of the earlier-described embodiment. While the mode select ring portion 11 of the foregoing embodiment depicted in FIGS. 1 to 3 is configured with the operating ring 31 and the entrapment body 6 which are formed as separate components, a mode select ring portion 11 depicted in FIG. 9 is formed as a one-piece component integrating the operating ring 31 and the entrapment body 6. This mode select ring portion 11 incorporates the locking mechanism 12 which is configured to be able to lock the mode select ring portion 11 in position and unlock the same by means of a pushbutton 71, the locking mechanism 12 being provided at a location where the operating portion 31g is formed in the previously described mode select ring portion 11 of the embodiment. Thus, the locking mechanism 12 is configured by forming an accommodating recess 72 in a curved outside surface of the filter frame 21, accommodating an engagement piece 74 elastically supported by a spring 73 in the accommodating recess 72, forming an accommodating hole 75 in the mode select ring portion 11, and accommodating a pushbutton element 76 in the accommodating hole 75. In the locking mechanism 12 thus configured, an upper part of the pushbutton element 76 which serves as the pushbutton 71 is exposed from an upper surface of the operating portion 31g and a lower end of the pushbutton element 76 is held in contact with (pressed against) an upper end of the engagement piece 74. In this modification of the embodiment, the aforementioned arrangement in which the accommodating recess 72 is formed in the curved outside surface of the filter frame 21 and the engagement piece 74 elastically supported by the spring 73 is accommodated in the accommodating recess 72 is provided at two locations in the curved outside surface of the filter frame 21 that are situated on 180-degree opposite sides the filter frame 21.

Accordingly, when the diaphragm device 1 is in the click mode Mc illustrated in FIG. 9, the lens L is in a natural state in which the pushbutton 71 is not depressed and the pushbutton element 76 is situated on a common axis with the engagement piece 74, so that the engagement piece 74 forces the pushbutton element 76 upward and an upper half of the engagement piece 74 goes into the accommodating hole 75 formed in the mode select ring portion 11. Thus, the engagement piece 74 becomes engaged, straddling the mode select ring portion 11 and the filter frame 21, thereby locking the mode select ring portion 11 (entrapment body 6) in position. If the user presses the pushbutton 71 in the state depicted in FIG. 9, the pushbutton element 76 forces the engagement piece 74 downward so that the engagement piece 74 can be unlocked from the mode select ring portion 11. Since the locking mechanism 12 is unlocked as a consequence, the user can turn the mode select ring portion 11. If the user turns the mode select ring portion 11 by 180 degrees to switch the lens L to the non-click mode Mn, the locking mechanism 12 is set in the same state as depicted in FIG. 9. Consequently, the click ball 4r presses against a flat surface (not shown) in which no click grooves 6cs are formed and the clicking function of the click mechanism Uc is deactivated. In this case, the mode select ring portion 11 (entrapment body 6) is in position where the lens L is set to the non-click mode Mn. In the foregoing discussion of the modifications of the embodiment of FIGS. 7 to 9, elements identical to those depicted in FIGS. 1 to 3 have been designated by the same reference symbols and a detailed description of such elements has not been provided.

While the preferred embodiment of the present invention and the modifications thereof have thus far been described, the invention is not limited to the embodiment and the modifications thereof set forth herein, and it should be recognized that various other modifications including additions and deletions are possible in terms of detailed structures, shapes, materials, the number of components, and the like, as long as such modifications do not constitute a departure from the spirit and scope of the invention.

For example, while the locking portion 5 of the click mechanism Uc described herein employs a combination of the click ball 4r and the coil spring 34, the present invention does not exclude a configuration employing other types of locking portions 5 capable of performing the same function as described in the foregoing, such as a locking portion 5 employing a leaf spring having a curved far end. Similarly, while the foregoing discussion has presented the configuration in which the entrapment portions 6c are formed as the click grooves 6cs, the invention does not exclude a configuration employing other types of entrapment portions 6c capable of performing the same function as described in the foregoing, such as elastically supporting members formed on and locked with projections on the side of the locking portion 5. Incidentally, the aforementioned flat surface 6n means a surface in which no entrapment portions 6c are formed and it does not matter that the "flat" surface 6n is actually warped. On the other hand, while one of the modifications of the foregoing embodiment has presented a case in which the click mechanism Uc is configured with the locking portion 5 disposed in the curved outside surface 2cf of the stationary tube 2c and the entrapment body 6 disposed on the inside surface 3i of the diaphragm setting ring 3, this configuration may be varied such that the locking portion 5 is disposed in the inside surface 3i of the diaphragm setting ring 3 and the entrapment body 6 is disposed on the curved outside surface 2cf of the stationary tube 2c. Additionally, the locking mechanism 12 may also employ a configuration of the prior art that can perform the same function.

INDUSTRIAL APPLICABILITY

The diaphragm device 1 of the present invention described herein may be used as a lens in various kinds of optical apparatuses, such as digital cameras and video cameras, wherein the lens may be either a lens manufactured as single article like an interchangeable lens or a lens integrally assembled in an optical apparatus as a non-interchangeable lens.

REFERENCE SIGNS LIST

1: Diaphragm device 2: Lens barrel 2c: Stationary tube 2cf: Curved outside surface 3: Diaphragm setting ring 3s: End surface (of diaphragm setting ring) 3i: Inside surface (of diaphragm setting ring) 4: Locking element 4r: Click ball 5: Locking portion 6: Entrapment body 6c: Entrapment portions 6cs: Click grooves 6f: Entrapment surface 6n: Flat surface 11: Mode select ring portion 11s: End surface (of the mode select ring portion) 12: Locking mechanism Uc: Click mechanism Um: Mode select mechanism Mc: Click mode Mn: non-click mode Ff: Circumferential direction Fs: Axial direction

CITATION LIST

Patent Literature 1

JP-No. 54(1979)-72039

Patent Literature 2

JP-No. 61(1986)-173227

The invention claimed is:

1. A diaphragm device of a lens, the diaphragm device comprising:
   a diaphragm setting ring rotatably mounted on a stationary tube of a lens barrel so as to be able to adjust a lens aperture;
   a click mechanism capable of stopping the diaphragm setting ring at positions corresponding to a plurality of aperture numbers with click action, the click mechanism including:
   a locking portion disposed in one of the stationary tube and the diaphragm setting ring, the locking portion having an elastically supported locking element; and
   an entrapment body disposed on the other of the stationary tube and the diaphragm setting ring, the entrapment body having an entrapment surface extending orthogonally relative to a longitudinal direction of the lens barrel, said entrapment surface including a plurality of entrapment portions formed thereon, the entrapment portions being capable of catching the locking element pressed against the entrapment surface in a longitudinal direction at one of the positions corresponding to the plurality of aperture numbers when the diaphragm setting ring is turned; and a mode select mechanism which makes it possible to switch the diaphragm device between click mode in which the locking element is longitudinally pressed against the entrapment surface and non-click mode in which a click function is deactivated with the locking element and the entrapment surface separated from each other by altering the position of at least one of the locking portion and the entrapment body.

2. The diaphragm device of the lens according to claim 1, wherein the click mechanism includes a click ball which serves as the locking element and click grooves which serve as the entrapment portions.

3. The diaphragm device of the lens according to claim 1, wherein the mode select mechanism is configured to make it possible to switch the diaphragm device to either of the click mode in which the locking element is longitudinally pressed against the entrapment surface and the non-click mode in which the click function is deactivated with the locking element separated from the entrapment surface by turning at least one of the locking portion and the entrapment body.

4. The diaphragm device of the lens according to claim 3, wherein the entrapment surface is separated from the locking element along a circumferential direction and the locking element is pressed against a flat surface having no entrapment portions in the non-click mode.

5. The diaphragm device of the lens according to claim 1, wherein the stationary tube is provided with a rotatably mounted operating ring and the mode select mechanism includes a mode select ring portion which makes it possible to alter the position of the entrapment body by operating the operating ring.

6. The diaphragm device of the lens according to claim 5, wherein the mode select ring portion is formed as a one-piece component integrating the operating ring and the entrapment body.

7. The diaphragm device of the lens according to claim 1, wherein the mode select mechanism is configured to make it possible to switch the diaphragm device to either of the click mode in which the locking element is longitudinally pressed against the entrapment surface and the non-click mode in which the click function is deactivated with the locking element separated from the entrapment surface by displacing at least one of the locking portion and the entrapment body along an axial direction.

8. The diaphragm device of the lens according to claim 7, wherein the click mechanism is configured with the locking portion disposed in one of a curved inside surface of the diaphragm setting ring and a curved outside surface of the stationary tube and the entrapment body disposed on the other of the curved inside surface of the diaphragm setting ring and the curved outside surface of the stationary tube.

9. The diaphragm device of the lens according to claim 8, wherein a V groove is formed along a circumferential direction in one of the curved inside surface of the diaphragm setting ring and the curved outside surface of the stationary tube and the locking portion which engages with the V groove in each of the click mode and the non-click mode is formed in the other of the curved inside surface of the diaphragm setting ring and the curved outside surface of the stationary tube.

10. The diaphragm device of the lens according to claim 7, wherein the stationary tube includes a mode select ring portion which makes it possible to alter the position of one of the locking portion and the entrapment body along the axial direction.

11. The diaphragm device of the lens according to claim 10, wherein a V groove is formed along a circumferential direction in one of a curved inside surface of the mode select ring portion and a curved outside surface of the stationary tube and the locking portion which engages with the V groove in each of the click mode and the non-click mode is formed in the other of the curved inside surface of the mode select ring portion and the curved outside surface of the stationary tube.

12. The diaphragm device of the lens according to claim 1, wherein the mode select mechanism includes a locking mechanism which locks one of locking portion and the entrapment body in position when the diaphragm device is switched to the click mode by altering the position of at least one of the locking portion and the entrapment body.

13. The diaphragm device of the lens according to claim 1, wherein the mode select mechanism includes a locking mechanism which locks one of locking portion and the entrapment body in position when the diaphragm device is switched to the non-click mode by altering the position of at least one of the locking portion and the entrapment body.

* * * * *